(12) United States Patent
Umehara et al.

(10) Patent No.: US 8,837,516 B2
(45) Date of Patent: Sep. 16, 2014

(54) COMMUNICATION APPARATUS, COMMUNICATION SYSTEM, COMMUNICATION APPARATUS CONTROL METHOD AND NON-TRANSITORY COMPUTER-READABLE STORAGE MEDIUM

(75) Inventors: Makoto Umehara, Kawasaki (JP); Naoto Takahashi, Saitama (JP); Tomoyuki Takada, Tokyo (JP); Wataru Tachiwa, Yokohama (JP); Hitoshi Asai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 184 days.

(21) Appl. No.: 13/439,376

(22) Filed: Apr. 4, 2012

(65) Prior Publication Data

US 2012/0263190 A1  Oct. 18, 2012

(30) Foreign Application Priority Data

Apr. 14, 2011  (JP) ................................. 2011-090406

(51) Int. Cl.
*H04L 12/43* (2006.01)
*H04J 3/06* (2006.01)

(52) U.S. Cl.
CPC ............. *H04J 3/0635* (2013.01); *H04J 3/0602* (2013.01)
USPC ........................................................ 370/458

(58) Field of Classification Search
None
See application file for complete search history.

(56) References Cited

U.S. PATENT DOCUMENTS

| | | | |
|---|---|---|---|
| 6,560,240 B1 * | 5/2003 | Borland et al. | 370/444 |
| 7,031,343 B1 * | 4/2006 | Kuo et al. | 370/473 |
| RE39,375 E * | 11/2006 | Hamalainen et al. | 370/322 |
| 7,675,840 B1 * | 3/2010 | Prismantas et al. | 370/201 |
| 7,826,475 B2 * | 11/2010 | Lee et al. | 370/445 |
| 2002/0044568 A1 * | 4/2002 | Smiljanic | 370/468 |
| 2002/0118697 A1 * | 8/2002 | Gopalakrishnan et al. | 370/441 |
| 2002/0122428 A1 * | 9/2002 | Fan et al. | 370/395.4 |
| 2004/0131028 A1 * | 7/2004 | Schiff et al. | 370/329 |
| 2004/0156465 A1 * | 8/2004 | Schmandt | 375/376 |
| 2004/0214582 A1 * | 10/2004 | Lan et al. | 455/452.2 |
| 2004/0215805 A1 * | 10/2004 | Tan et al. | 709/231 |
| 2006/0034246 A1 * | 2/2006 | Smiljanic | 370/348 |
| 2006/0253853 A1 * | 11/2006 | Jiang | 718/100 |
| 2008/0019690 A1 * | 1/2008 | Zhao et al. | 398/17 |
| 2008/0219269 A1 * | 9/2008 | Minkenberg et al. | 370/395.4 |
| 2009/0197587 A1 * | 8/2009 | Frank | 455/422.1 |
| 2010/0074133 A1 * | 3/2010 | Kim et al. | 370/252 |
| 2012/0155284 A1 * | 6/2012 | Shaffer et al. | 370/242 |

FOREIGN PATENT DOCUMENTS

| | | | |
|---|---|---|---|
| JP | 2005-303534 A | 10/2005 | |
| JP | 2007-228462 A | 9/2007 | |

* cited by examiner

*Primary Examiner* — Otis L Thompson, Jr.
(74) *Attorney, Agent, or Firm* — Carter, DeLuca, Farrell & Schmidt, LLP

(57) ABSTRACT

A communication apparatus performs communication of data using assigned time slots within a frame. In a case where data cannot be transmitted in a transmission time slot that has been assigned in order to transmit data, a time slot later than this transmission time slot is reserved as a time slot used to transmit the data, this later time slot being reserved within the frame having the transmission time slot in which the data cannot be transmitted.

18 Claims, 13 Drawing Sheets

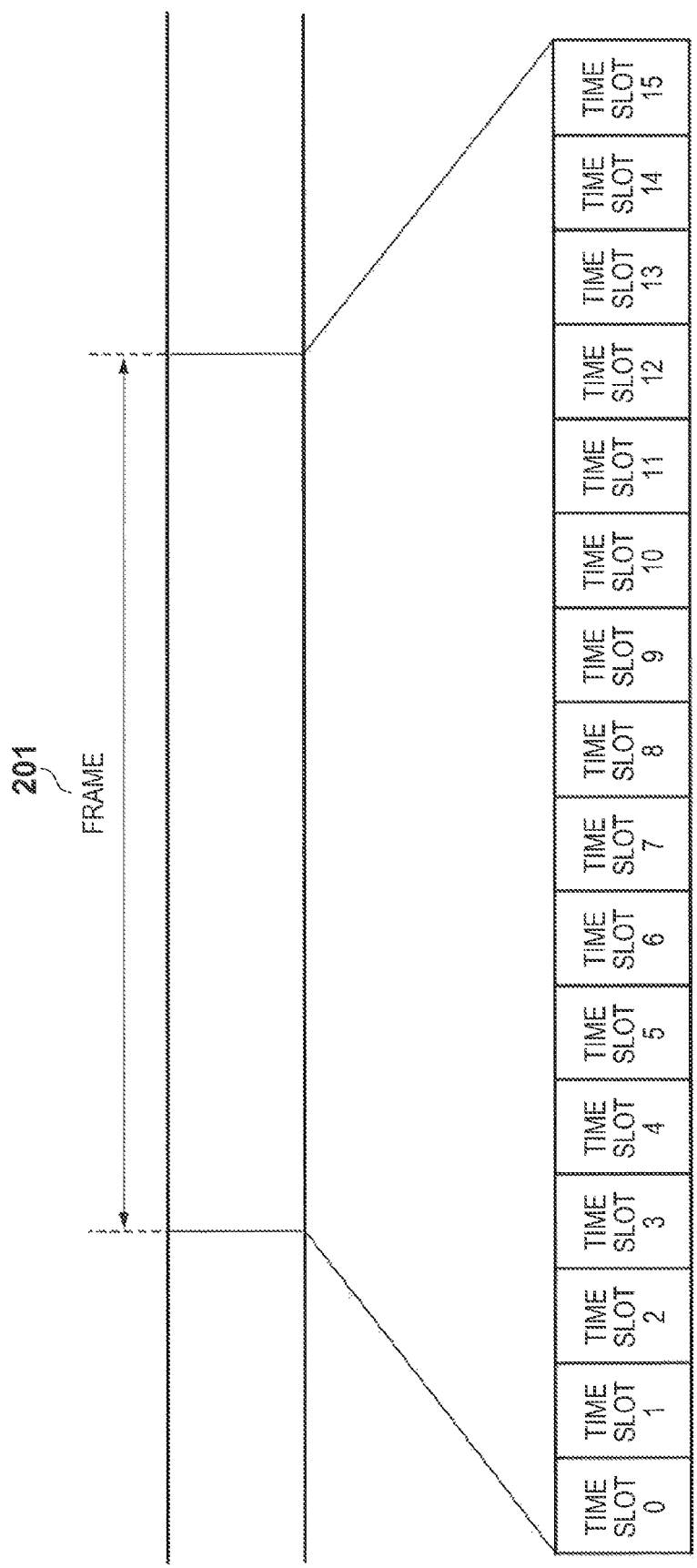

FIG. 3

| TIME SLOT | TRANSMISSION SOURCE | RECEPTION DESTINATION | TRANSMISSION CONTENTS |
|---|---|---|---|
| 0 | OVERALL CONTROL UNIT 101 | FINGERTIP CONTROL UNITS 103-1 TO 103-5 | FRAME SYNCHRONIZING SIGNAL |
| 1 | OVERALL CONTROL UNIT 101 | FINGERTIP CONTROL UNITS 103-1 | TARGET FINGERTIP POSITION |
| 2 | OVERALL CONTROL UNIT 101 | FINGERTIP CONTROL UNITS 103-2 | TARGET FINGERTIP POSITION |
| 3 | OVERALL CONTROL UNIT 101 | FINGERTIP CONTROL UNITS 103-3 | TARGET FINGERTIP POSITION |
| 4 | OVERALL CONTROL UNIT 101 | FINGERTIP CONTROL UNITS 103-4 | TARGET FINGERTIP POSITION |
| 5 | OVERALL CONTROL UNIT 101 | FINGERTIP CONTROL UNITS 103-5 | TARGET FINGERTIP POSITION |
| 6 | | | |
| 7 | | | |
| 8 | OVERALL CONTROL UNIT 103-1 | OVERALL CONTROL UNIT 101 | FINGERTIP POSITION DEVIATION |
| 9 | OVERALL CONTROL UNIT 103-2 | OVERALL CONTROL UNIT 101 | FINGERTIP POSITION DEVIATION |
| 10 | OVERALL CONTROL UNIT 103-3 | OVERALL CONTROL UNIT 101 | FINGERTIP POSITION DEVIATION |
| 11 | OVERALL CONTROL UNIT 103-4 | OVERALL CONTROL UNIT 101 | FINGERTIP POSITION DEVIATION |
| 12 | FINGERTIP CONTROL UNITS 103-5 | OVERALL CONTROL UNIT 101 | FINGERTIP POSITION DEVIATION |
| 13 | | | |
| 14 | | | |
| 15 | | | |

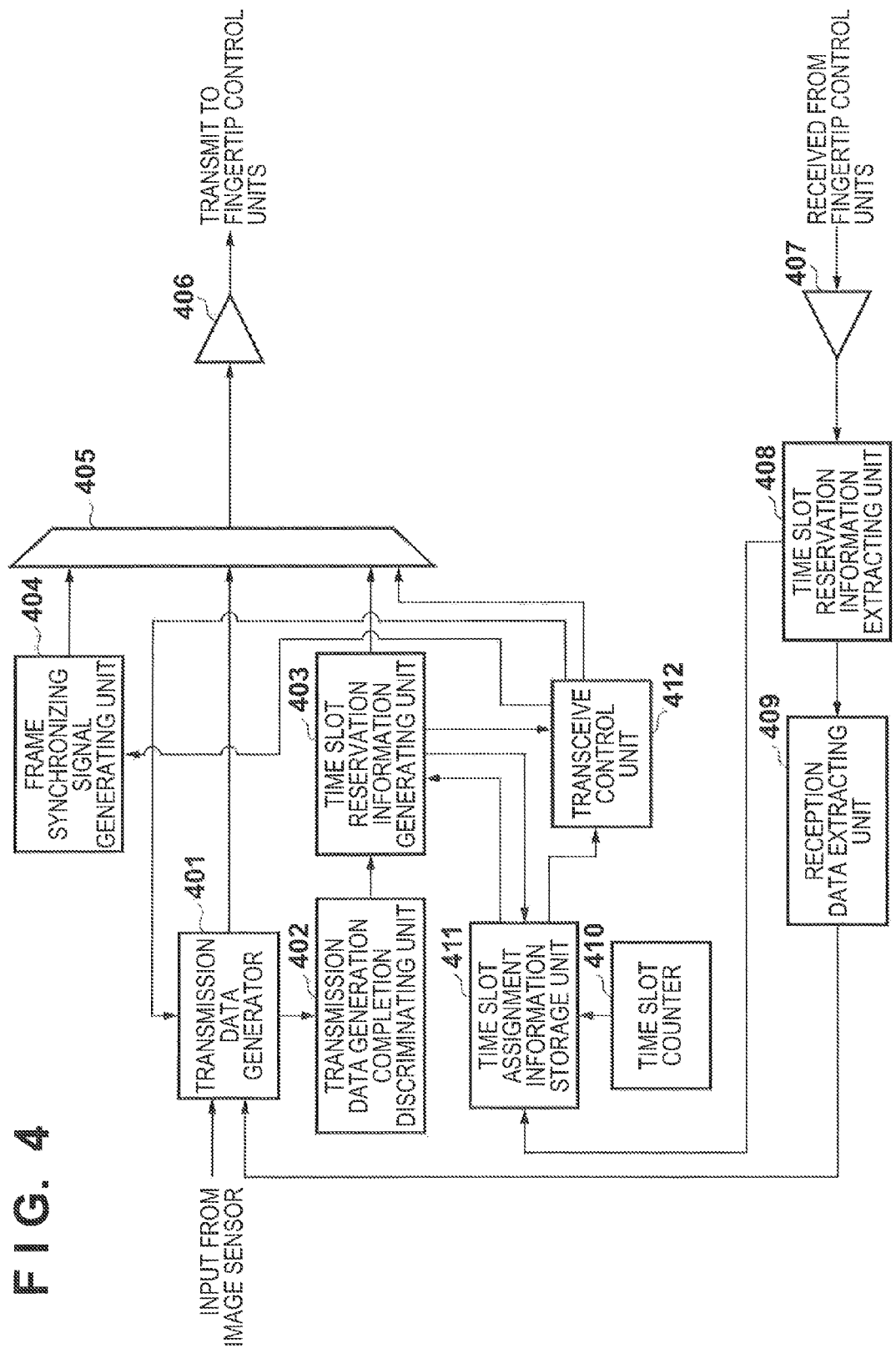

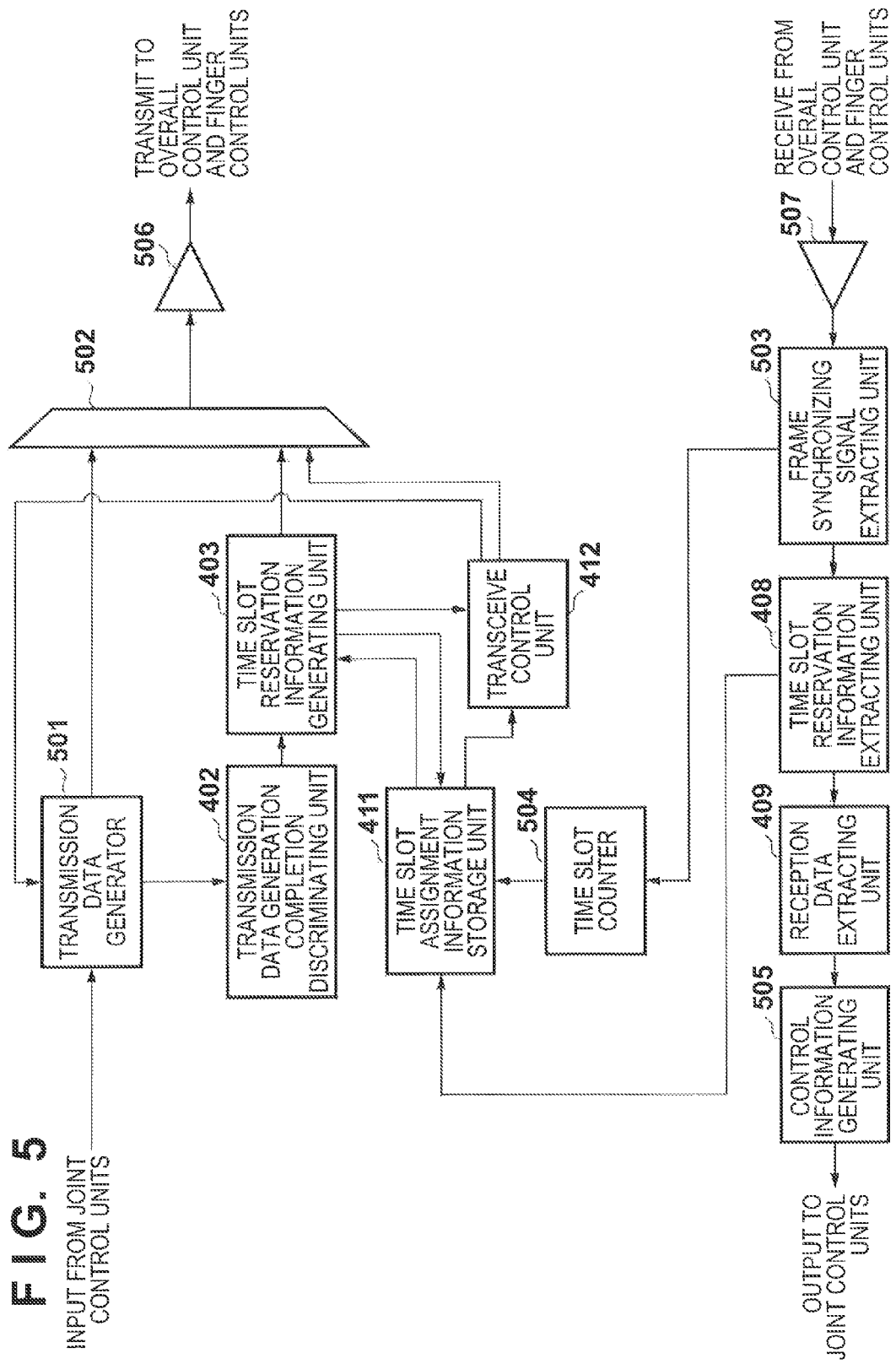

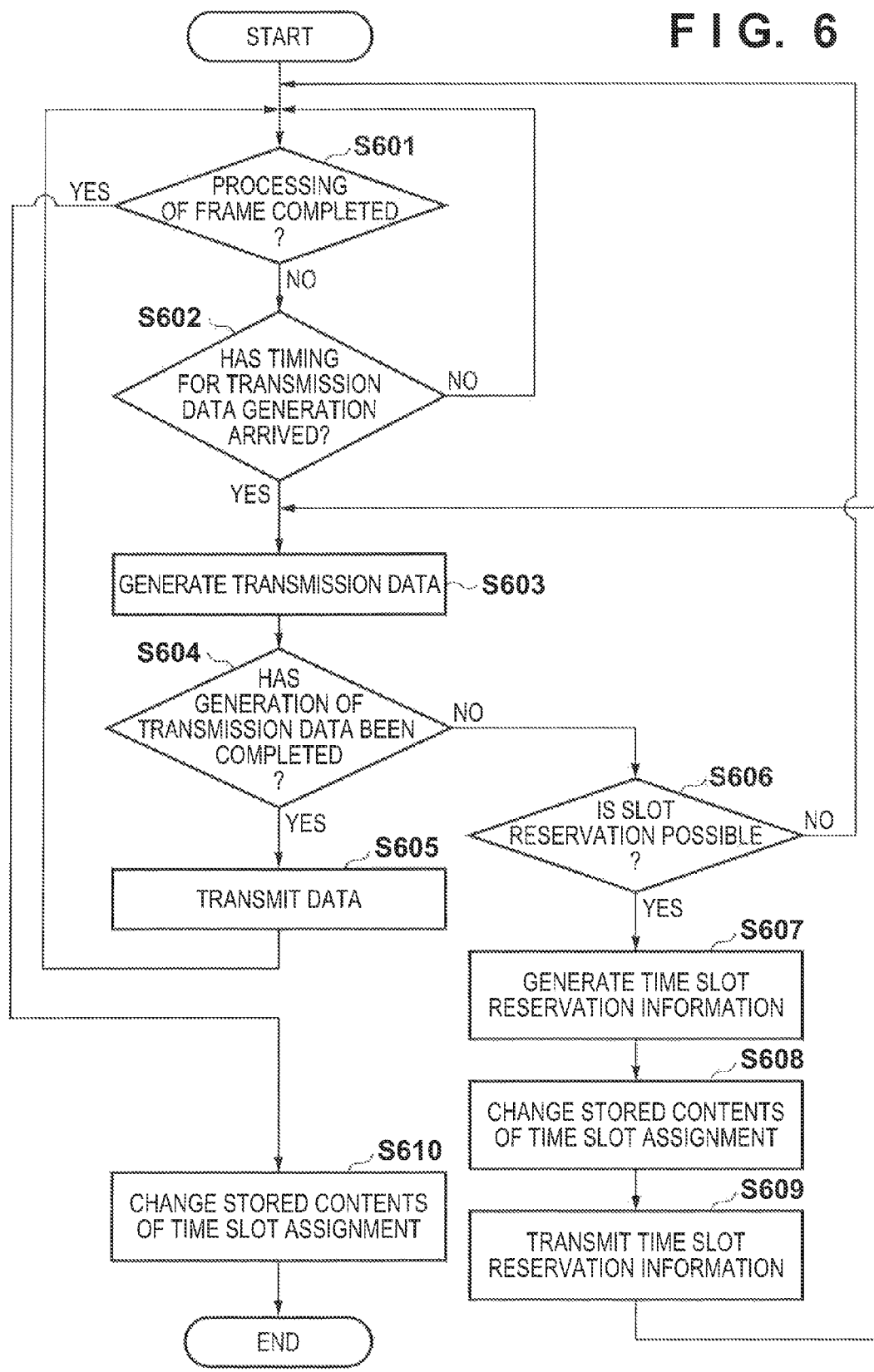

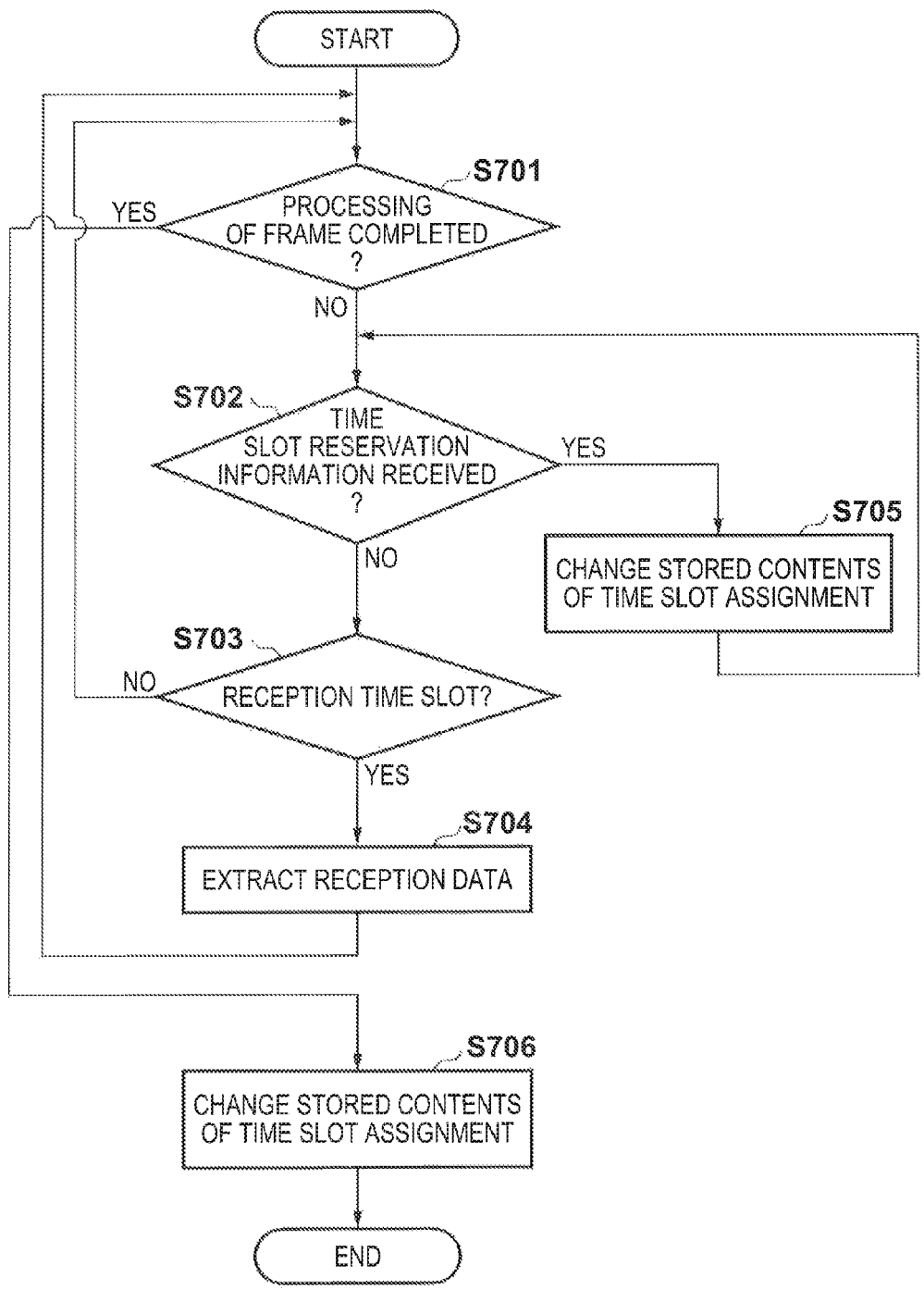

FIG. 8

| TIME SLOT | TRANSMISSION SOURCE | RECEPTION DESTINATION | TRANSMISSION CONTENTS |
|---|---|---|---|
| 0 | OVERALL CONTROL UNIT 101 | OVERALL CONTROL UNITS 103-1 TO 103-5 | FRAME SYNCHRONIZING SIGNAL |
| 1 | OVERALL CONTROL UNIT 101 | OVERALL CONTROL UNITS 103-1 | TARGET FINGERTIP POSITION |
| 2 | OVERALL CONTROL UNIT 101 | OVERALL CONTROL UNITS 103-2 | TARGET FINGERTIP POSITION |
| 3 | OVERALL CONTROL UNIT 101 | OVERALL CONTROL UNITS 103-3 | TARGET FINGERTIP POSITION |
| 4 | OVERALL CONTROL UNIT 101 | OVERALL CONTROL UNITS 103-4 | TARGET FINGERTIP POSITION |
| 5 | OVERALL CONTROL UNIT 101 | OVERALL CONTROL UNITS 103-5 | TARGET FINGERTIP POSITION |
| 6 | | | |
| 7 | | | |
| 8 | OVERALL CONTROL UNIT 103-1 | OVERALL CONTROL UNIT 101 | TIME SLOT RESERVATION INFORMATION |
| 9 | OVERALL CONTROL UNIT 103-2 | OVERALL CONTROL UNIT 101 | FINGERTIP POSITION DEVIATION |
| 10 | OVERALL CONTROL UNIT 103-3 | OVERALL CONTROL UNIT 101 | FINGERTIP POSITION DEVIATION |
| 11 | OVERALL CONTROL UNIT 103-4 | OVERALL CONTROL UNIT 101 | FINGERTIP POSITION DEVIATION |
| 12 | FINGERTIP CONTROL UNITS 103-5 | OVERALL CONTROL UNIT 101 | FINGERTIP POSITION DEVIATION |
| 13 | | | |
| 14 | FINGERTIP CONTROL UNITS 103-1 | OVERALL CONTROL UNIT 101 | FINGERTIP POSITION DEVIATION |
| 15 | | | |

FIG. 10

| TIME SLOT | TRANSMISSION SOURCE | RECEPTION DESTINATION | TRANSMISSION CONTENTS |
|---|---|---|---|
| 0 | OVERALL CONTROL UNIT 101 | FINGERTIP CONTROL UNITS 103-1 TO 103-5 | FRAME SYNCHRONIZING SIGNAL |
| 1 | OVERALL CONTROL UNIT 101 | FINGERTIP CONTROL UNITS 103-1 | TARGET FINGERTIP POSITION |
| 2 | OVERALL CONTROL UNIT 101 | FINGERTIP CONTROL UNITS 103-2 | TARGET FINGERTIP POSITION |
| 3 | OVERALL CONTROL UNIT 101 | FINGERTIP CONTROL UNITS 103-3 | TIME SLOT RESERVATION INFORMATION |
| 4 | OVERALL CONTROL UNIT 101 | FINGERTIP CONTROL UNITS 103-4 | TARGET FINGERTIP POSITION |
| 5 | OVERALL CONTROL UNIT 101 | FINGERTIP CONTROL UNITS 103-3 | TARGET FINGERTIP POSITION |
| 6 | OVERALL CONTROL UNIT 101 | FINGERTIP CONTROL UNITS 103-5 | TARGET FINGERTIP POSITION |
| 7 | | | |
| 8 | | | |
| 9 | FINGERTIP CONTROL UNIT 103-1 | OVERALL CONTROL UNIT 101 | FINGERTIP POSITION DEVIATION |
| 10 | FINGERTIP CONTROL UNIT 103-2 | OVERALL CONTROL UNIT 101 | FINGERTIP POSITION DEVIATION |
| 11 | FINGERTIP CONTROL UNIT 103-3 | OVERALL CONTROL UNIT 101 | FINGERTIP POSITION DEVIATION |
| 12 | FINGERTIP CONTROL UNIT 103-4 | OVERALL CONTROL UNIT 101 | FINGERTIP POSITION DEVIATION |
| 13 | FINGERTIP CONTROL UNITS 103-5 | OVERALL CONTROL UNIT 101 | FINGERTIP POSITION DEVIATION |
| 14 | | | |
| 15 | | | |

FIG. 11

| TIME SLOT | TRANSMISSION SOURCE | RECEPTION DESTINATION | TRANSMISSION CONTENTS |
|---|---|---|---|
| 0 | OVERALL CONTROL UNIT 101 | FINGERTIP CONTROL UNITS 103-1 TO 103-5 | FRAME SYNCHRONIZING SIGNAL |
| 1 | OVERALL CONTROL UNIT 101 | FINGERTIP CONTROL UNITS 103-1 | TARGET FINGERTIP POSITION |
| 2 | OVERALL CONTROL UNIT 101 | FINGERTIP CONTROL UNITS 103-2 | TARGET FINGERTIP POSITION |
| 3 | OVERALL CONTROL UNIT 101 | FINGERTIP CONTROL UNITS 103-3 | TIME SLOT RESERVATION INFORMATION |
| 4 | OVERALL CONTROL UNIT 101 | FINGERTIP CONTROL UNITS 103-4 | TARGET FINGERTIP POSITION |
| 5 | OVERALL CONTROL UNIT 101 | FINGERTIP CONTROL UNITS 103-3 | TARGET FINGERTIP POSITION |
| 6 | OVERALL CONTROL UNIT 101 | FINGERTIP CONTROL UNITS 103-5 | TARGET FINGERTIP POSITION |
| 7 | | | |
| 8 | FINGERTIP CONTROL UNIT 103-1 | OVERALL CONTROL UNIT 101 | FINGERTIP POSITION DEVIATION |
| 9 | FINGERTIP CONTROL UNIT 103-2 | OVERALL CONTROL UNIT 101 | FINGERTIP POSITION DEVIATION |
| 10 | FINGERTIP CONTROL UNIT 103-3 | OVERALL CONTROL UNIT 101 | FINGERTIP POSITION DEVIATION |
| 11 | FINGERTIP CONTROL UNIT 103-4 | OVERALL CONTROL UNIT 101 | FINGERTIP POSITION DEVIATION |
| 12 | FINGERTIP CONTROL UNITS 103-5 | OVERALL CONTROL UNIT 101 | FINGERTIP POSITION DEVIATION |
| 13 | | | |
| 14 | | | |
| 15 | | | |

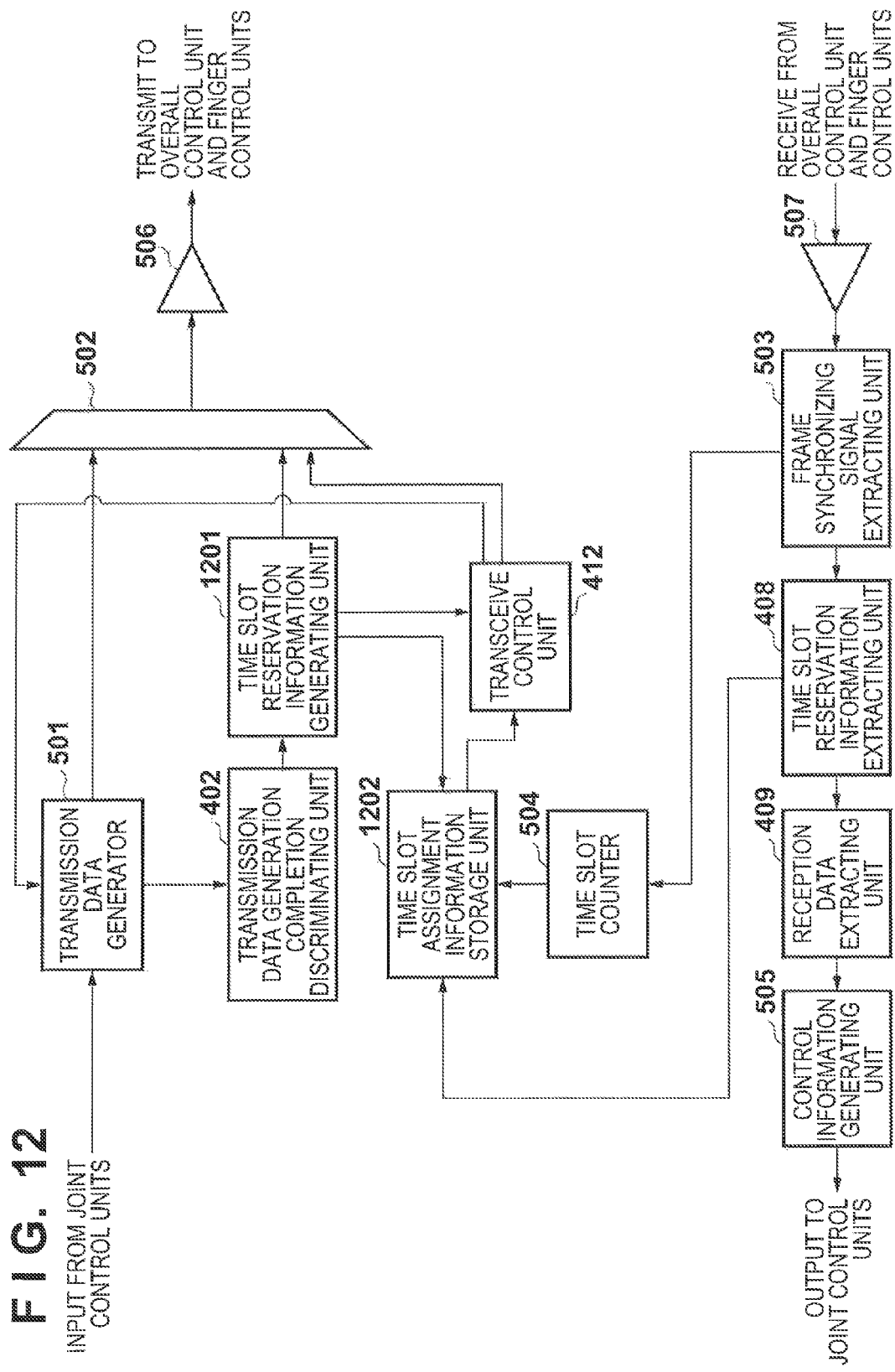

F I G. 13

| TIME SLOT | TRANSMISSION SOURCE | RECEPTION DESTINATION | TRANSMISSION CONTENTS |
|---|---|---|---|
| 0 | OVERALL CONTROL UNIT 101 | FINGERTIP CONTROL UNITS 103-1 TO 103-5 | FRAME SYNCHRONIZING SIGNAL |
| 1 | OVERALL CONTROL UNIT 101 | FINGERTIP CONTROL UNITS 103-1 | TARGET FINGERTIP POSITION |
| 2 | OVERALL CONTROL UNIT 101 | FINGERTIP CONTROL UNITS 103-2 | TARGET FINGERTIP POSITION |
| 3 | OVERALL CONTROL UNIT 101 | FINGERTIP CONTROL UNITS 103-3 | TARGET FINGERTIP POSITION |
| 4 | OVERALL CONTROL UNIT 101 | FINGERTIP CONTROL UNITS 103-4 | TARGET FINGERTIP POSITION |
| 5 | OVERALL CONTROL UNIT 101 | FINGERTIP CONTROL UNITS 103-5 | TARGET FINGERTIP POSITION |
| 6 | | | |
| 7 | | | |
| 8 | FINGERTIP CONTROL UNIT 103-1 | OVERALL CONTROL UNIT 101 | FINGERTIP POSITION DEVIATION |
| 9 | FINGERTIP CONTROL UNIT 103-2 | OVERALL CONTROL UNIT 101 | FINGERTIP POSITION DEVIATION |
| 10 | FINGERTIP CONTROL UNIT 103-3 | OVERALL CONTROL UNIT 101 | TIME SLOT RESERVATION INFORMATION |
| 11 | FINGERTIP CONTROL UNIT 103-4 | OVERALL CONTROL UNIT 101 | FINGERTIP POSITION DEVIATION |
| 12 | FINGERTIP CONTROL UNITS 103-3 | OVERALL CONTROL UNIT 101 | FINGERTIP POSITION DEVIATION |
| 13 | FINGERTIP CONTROL UNITS 103-5 | OVERALL CONTROL UNIT 101 | FINGERTIP POSITION DEVIATION |
| 14 | | | |
| 15 | | | |

COMMUNICATION APPARATUS, COMMUNICATION SYSTEM, COMMUNICATION APPARATUS CONTROL METHOD AND NON-TRANSITORY COMPUTER-READABLE STORAGE MEDIUM

BACKGROUND OF THE INVENTION

1. Field of the Invention

The present invention relates to a communication technique that makes it possible to avoid omission of communication data.

2. Description of the Related Art

The greater functionality of devices achieved in recent years has teen accompanied by the problem of increased internal wiring of such devices. For example, in a robot system such as that of an industrial robot, when the numbers of fingers, joints and sensors are increased in order to accommodate more complex operations, a problem which arises is a decline in assembly capability because the number of wiring interconnections increases and the wiring itself impedes operation. Accordingly, greater use is being made of network communication for transmission of information within the system in order to reduce the number of wiring interconnections. In a case where real-time control such as servo control is carried out in such a system, the general practice is to use cyclic communication based upon TDMA.

When servo control using TDMA-based cyclic communication is carried out, time slots within a frame are assigned to respective ones of a master device and multiple slave devices. In the time slot assigned to it, the master device transmits a servo instruction suet as a target angle to each slave device. The slave device is provided with a motor and an angle sensor such as an encoder. The slave device drives the motor based upon the servo instruction received from the master device, acquires the rotational angle of the motor from the angle sensor and calculates a deviation between the servo instruction and the actual angle. The slave device transmits the deviation to the master device in the assigned time slot. The master device generates the servo instruction of the next frame based upon the deviation transmitted from the slave device. Feedback control of the system is carried out by these operations.

In a case where generation of the servo instruction and calculation of the deviation are executed by software processing, a fluctuation in processing time arises and processing may not be completed by the assigned transmission time slot. In such case, a problem which arises is that, normal communication will not be achieved and both control precision and control stability will decline.

A technique described in the specification of Japanese Patent Laid-Open No. 2005-303534 is known as a technique for dealing with this problem. This technique puts transmission on hold in a case where the generation of transmission data as not completed, thereby assuring simultaneity of transmission data. With Japanese Patent Laid-Open No. 2005-303534, if the generation of transmission data is not completed, omission of communication data will occur in the applicable frame but, if control computations are halted at this time, a problem which arises is unstable operation. A technique described in the specification of Japanese Patent Laid-Open No. 2007-228462 for dealing with this problem generates a control-computation start signal if omission of communication data has occurred, thereby executing control computations in continuous fashion.

However, even if the techniques described in Japanese Patent Laid-Open No. 2005-303534 and Japanese Patent Laid-Open No. 2007-228462 are used, when processing for generating transmission data is not completed, omission of communication data occurs and control is carried out with the sending and receiving of the latest data remaining unexecuted in the applicable frame. Accordingly, in a case where processing is not completed by the assigned transmission time slot, the problem of diminished control precision and control stability remains unsolved. A conceivable method of avoiding this problem is to assign a time slot to each device upon assuring adequate processing time for generating the transmission data. However, although this method enables omission of communication data to be avoided, frame length, namely control cycle time, cannot be shortened. This makes it difficult to improve control precision and response.

SUMMARY OF THE INVENTION

The present invention has been devised in view of the foregoing problems and provides a communication, technique whereby omission of communication data can be avoided in a case where data cannot be transmitted in an assigned time slot within a frame.

According to one aspect of the present invention, there is provided a communication apparatus, comprising: a transmitting unit configured to transmit data in a first transmission time slot, which has been assigned within a frame in order to transmit data from the communication apparatus; and a reserving unit configured to reserve, in a case where data cannot be transmitted in the first transmission time slot, a second transmission time slot, for transmitting the data, which cannot be transmitted, within the frame having the first transmission time slot, wherein the reserving unit reserves the second transmission time slot whose position is later than position of the first transmission time slot.

According to another aspect of the present invention, there is provided a communication system having a plurality of communication apparatuses, wherein a first communication apparatus comprises: a transmitting unit configured to transmit data in a first transmission time slot, which has been assigned within a frame in order to transmit data, from the first communication apparatus; and a reserving unit configured to reserve, in a case where data cannot be transmitted in the first transmission time slot, a second transmission time slot for transmitting the data, which cannot be transmitted, within the frame having the first transmission time slot, wherein the reserving unit reserves the second transmission time slot whose position is later than position of the first transmission time slot; and a second communication apparatus comprises: a detecting unit configured to detect the second transmission time slot reserved by the reserving unit of the first communication apparatus; and a changing unit, configured to change time slot assignment of the frame in which the second transmission time slot has been reserved, based upon the reservation detected by the detecting unit.

In accordance with the present invention, it is possible to provide a communication technique whereby omission of communication data can be avoided in a case where data cannot be transmitted in an assigned time slot within a frame. Accordingly, it is possible to achieve control that excels in control precision and stability, by way of example.

Alternatively, since omission of communication data can be avoided in similar fashion even in a case where frame length has been shortened, control cycle time can be shortened and control precision and stability improved.

Further features of the present invention will become apparent from the following description of exemplary embodiments (with reference to the attached drawings).

BRIEF DESCRIPTION OF THE DRAWINGS

FIG. 2 is a diagram, showing the structure of a frame;

FIG. 3 is a diagram exemplifying assignment of time slots;

FIG. 4 is a block diagram illustrating the internal configuration of an overall control unit in a first embodiment;

FIG. 5 is a block diagram illustrating the internal configuration of a finger control unit in the first embodiment;

FIG. 6 is an operation flowchart relating to a transmission operation;

FIG. 7 is an operation flowchart relating to a reception operation;

FIG. 8 is a diagram exemplifying assignment of time slots in the first embodiment;

FIG. 10 is a diagram exemplifying assignment of time slots in the second embodiment;

FIG. 11 is a diagram exemplifying assignment of time slots in the second embodiment;

FIG. 12 is a block diagram illustrating the internal configuration of a finger control unit in the second embodiment; and FIG. 13 is a diagram exemplifying assignment of time slots in the second embodiment.

DESCRIPTION OF THE EMBODIMENTS

Embodiments of the present invention will now be described in detail with reference to the drawings.

First Embodiment

The communication apparatus according to the present invention can be applied to a communication system for data communication using time slots assigned within a frame. The communication system has a plurality of communication apparatuses (a first communication apparatus and a second communication apparatus). For example, the first communication apparatus transmits data in a transmission time slot assigned in order that the first communication apparatus will transmit data. If data cannot be transmitted, the first communication apparatus reserves a time slot whose position is later than position of the transmission time slot as a time slot for the data transmission. The second communication apparatus detects the time slot reserved by the first communication apparatus and, based upon the detected reservation, changes the assignment of time slots of the frame in which the above-mentioned time slot has been reserved.

Figure 1:
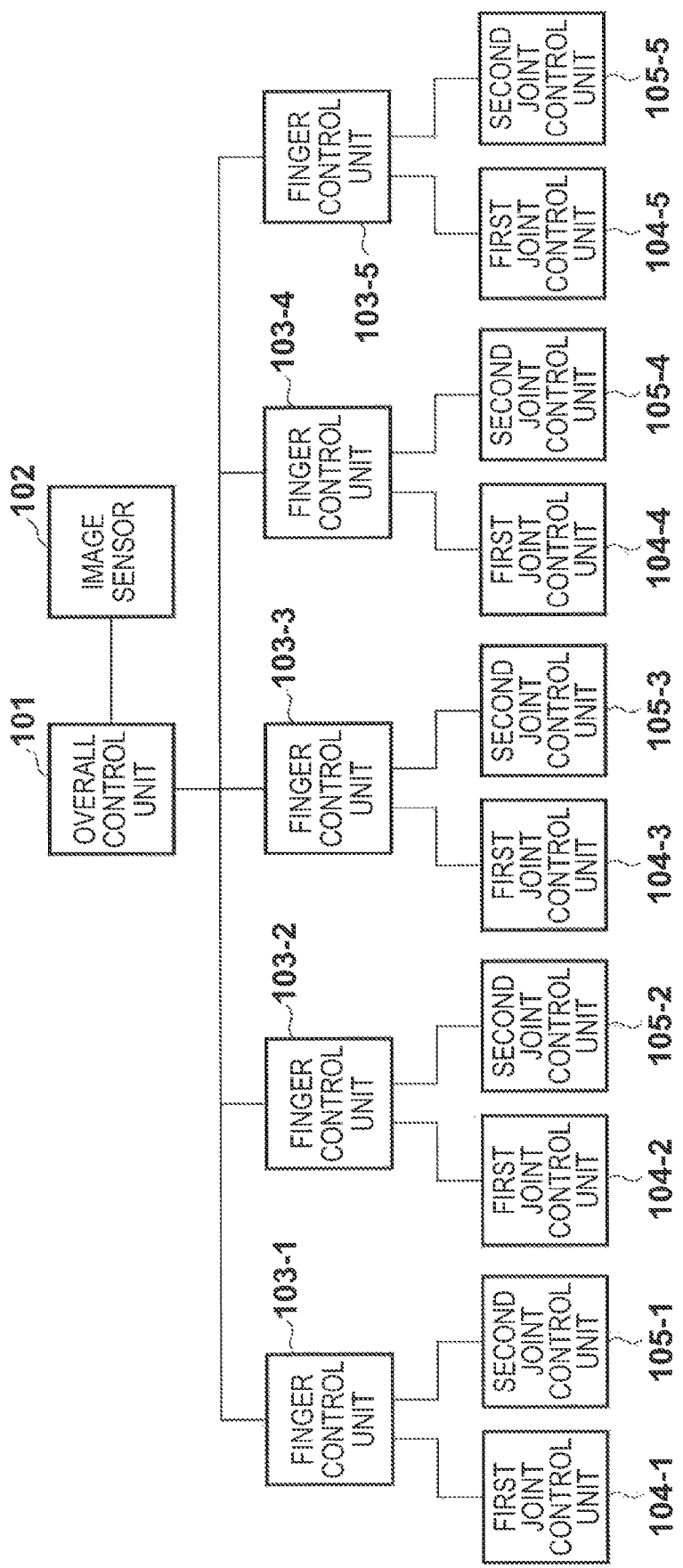
FIG. 1 is a block diagram of a multi-fingered robot hand system to which a communication apparatus according to an embodiment of the present invention has been applied.

As a specific example, the configuration of a multi-fingered robot hand system, will be described with reference to FIG. 1 as a system to which the communication apparatus according to the present invention has been applied. The multi-fingered robot hand, system is equipped with five fingers each having two joints capable of being driven independently. Joint control units are arranged in dispersed fashion. From image data that enters from an image sensor 102, an overall control unit 101 capable of functioning as a communication apparatus identifies an object to be grasped and outputs fingertip target positions to finger control units 103-1 to 103-5 capable of functioning as communication apparatuses. By relying upon TDMA, the overall control unit 101 and finger control units 103-1 to 103-5 function as communication apparatuses for performing data communication periodically using time slots assigned within a frame. The overall control unit 101 and finger control units 103-1 to 103-5 that function as communication apparatuses constitute a communication system.

The finger control units 103-1 to 103-5 obtain by computation the angles of each of the joints that satisfy the target fingertip positions and output the target joint angles to respective ones of first joint control units 104-1 to 104-5 and second joint control units 105-1 to 105-5. The first joint control units 104-1 to 104-5 and second joint control units 105-1 to 105-5 have motors and angle sensors such as encoders, none of which are shown, and control the motors based upon the target joint angles. Further, the first joint control units 104-1 to 104-5 and second joint control units 105-1 to 105-5 output angular deviations between the target joint angles and actual joint angles to the finger control units 103-1 to 103-5. The finger control units 103-1 to 105-5 calculate fingertip position deviations from the angular deviations of the respective joint control units and output these to the overall control unit 101. This give and take between the control units is carried out every predetermined control cycle time. The overall control unit 101 generates the target fingertip positions of the next cycle by computation using the fingertip position deviations as feedback information. The description of this embodiment is premised upon use of TDMA-based cyclic communication (fixed-period communication) for transmission of information among the overall control unit 101 and finger control units 103-1 to 103-5 capable of functioning as communication apparatuses. However, the gist of the present invention is not limited to such communication and an arrangement may be adopted in which network communication between any of the control units is used.

FIG. 2 is a diagram of the structure of a frame 201 used in transmission of information by TDMA-based cyclic communication between the overall control unit 101 and finger control units 103-1 to 103-5. The frame 201 has been divided into a predetermined number of time slots and the time slots serve as units of data transmission and reception. In this embodiment, one frame has been divided into 16 time slots and communication between the overall control unit 101 and finger control units 103-1 to 103-5 is carried out using each of the time slots. The number of divisions of one frame can be set freely. In addition, the frame length is capable of being set so as to agree with the control cycle time.

FIG. 3 is a diagram illustrating assignment of time slots of communication performed between the overall control unit 101 and finger control units 103-1 to 103-5. In time slot 0, which is at the head of the frame, a fixed-pattern frame synchronizing signal is transmitted from the overall control unit 101 to the finger control units 103-1 to 103-5. The finger control units 103-1 to 103-5 detect the beginning of frame 201 by detecting the pattern of the frame synchronizing signal. In time slots 1 to 5, target fingertip positions are transmitted from the overall control unit 101 to respective ones of the finger control units 103-1 to 103-5. Time slots 6 and 7 are time periods provided in order that, the finger control units 103-1 to 103-5 may compute and generate fingertip position deviations that will be sent to the overall control unit 101. These are available time slots. In time slots 8 to 12, fingertip position deviations are transmitted from respective ones of the finger control units 103-1 to 103-5 to the overall control unit 101. Further, time slots 13 to 15 are time periods provided in order that the overall control unit 101 may compute and generate target fingertip positions that will be sent to the finger control units 103-1 to 103-5. These are available time slots.

Internal Configuration of Overall Control Unit 101

Reference will be had to FIG. 4 to describe the internal configuration of the overall control unit 101 that functions as a communication apparatus according to the first embodiment. A transmission data generator 401 generates target fingertip positions, which will be transmitted in the next frame, based upon image data that enters from the image sensor 102 and the fingertip position deviations received from the finger control units 103-1 to 103-5. In this embodiment, the transmission data generator 401 calculates the barycentric position of a robot hand from fingertip position deviations of each of the fingers and generates the target fingertip positions of the next frame upon taking the barycentric position into consideration. That is, after it receives the fingertip position deviations from all of the finger control units 103-1 to 103-5 (after time slot 12 in FIG. 3, for example), the transmission data generator 401 starts the generation of the target fingertip positions of the next frame. Accordingly, the fingertip position deviations from the finger control units 103-1 to 103-5 constitute data that is output from a reception data extracting unit 409, described later. A transceive control unit 412 notifies the transmission data generator 401 of the timing of a transmission time slot. At this time the transmission data generator 401 discriminates the progress of processing for generating data to be transmitted and, if the generation of data to be transmitted has been completed in this transmission time slot, outputs the transmission data to a selector 405. Further, if the generation of the transmission data has not been completed, then the transmission data generator 401 outputs the progress of processing for generating transmission data to a transmission data generation completion discriminating unit 402. In order to implement the outputting of the progress of processing for generating transmission data, a variable for holding such progress is provided within a transmission data generation processing task and a program is added on for updating the value of this variable every predetermined step. Then, after notification of the timing of the transmission time-slot has been given, the value of the variable is output. This makes it possible to readily implement the output of progress of processing.

When notified by the transmission data generator 401 of the progress of processing for generating transmission data, the transmission data generation completion discriminating unit 402 estimates the length of time until generation of transmission data is completed. The transmission data generation completion discriminating unit 402 outputs to a time slot reservation information generating unit 403 the time slot number that will prevail after elapse of the time estimated for completion of generation of the transmission data. Estimation of the time slot in which the generation of transmission data will be completed is carried out as follows, by say of example: Progress is found, as a percentage by dividing the value of the variable that is output from the transmission data generator 401 by the value of a variable held in a case where processing for generating the transmission information is completed. Progress speed per unit time is found by dividing this progress value by the length of time from the start of generation of the transmission data to the transmission time slot, and the length of time required for the completion of generation of the transmission data is estimated based upon the found value of progress speed. The number of the time slot that will prevail upon elapse of this estimated length of time is output to the time slot reservation information generating unit 403.

The number of an unassigned available time slot is input to the time slot reservation information generating unit 403 from a time slot assignment information storage unit 411. The time slot reservation information generating unit 403 generates time slot reservation information for reserving use of a time slot the number of which falls on or after the number of the time slot that enters from the transmission data generation completion discriminating unit 402 and, moreover, which is an available time slot. The time slot reservation information constitutes data comprising the number of the reserved time slot, the transmission source and the reception destination. In a case where the time slot reservation information generating unit 403 generates time slot reservation information, the unit notifies the time slot assignment information storage unit 411 of the contents of this information. The time slot reservation, information generating unit 403 further notifies the transceive control unit 412 of the fact that the time slot reservation information has been generated. The transceive control unit 412 controls the selector 405 based upon this notification.

Upon being notified by the transceive control unit 412 of the timing of the time slot (time slot 0) for transmission of the frame synchronizing signal, a frame synchronizing signal generating unit 404 outputs the frame synchronizing signal to the selector 405. The selector 405 operates based upon control exercised by the transceive control unit 412. The selector 405 outputs any one of the outputs of the transmission data generator 401, time slot reservation information generating unit 403 and frame synchronizing signal generating unit 404 to a line driver 406. The line driver 406 transmits the data that enters from the selector 405 to the finger control units 103-1 to 103-5. If there is no input data from the selector 405, then the line driver 406 places its output terminal at a high impedance.

A line receiver 407 receives data from the finger control units 103-1 to 103-5 and outputs the data to a time slot reservation information extracting unit 408. The time slot reservation information extracting unit 408 extracts time slot reservation information from the data received from the finger control units 103-1 to 103-5 and outputs this information to the time slot assignment information storage unit 411.

From the data received from the finger control units 103-1 to 103-5, the reception data extracting unit 403 extracts data addressed to itself (addressed to the overall control unit 101). The reception data extracting unit 409 outputs the fingertip position deviations of the finger control units 103-1 to 103-5, which is data addressed to the overall control unit 101, to the transmission data generator 401.

A time slot counter 410 increments its count value whenever a time equivalent to one time slot elapses and outputs the count value to the time slot assignment information storage unit 411. The count value is reset frame by frame.

The time slot assignment information shown in FIG. 3 has been stored in the time slot assignment information storage unit 411. The time slot assignment information storage unit 411 outputs time slot assignment information, which conforms to the count value that enters from the time slot counter 410, to the transceive control unit 412. The time slot assignment information storage unit 411 (also referred to simply as "information storage unit 411" below) changes the stored contents of the time slot assignment information (also referred to as "stored, contents" below) in accordance with the input of time slot assignment information. In a case time slot reservation information has entered from at least one of time slot reservation information generating unit 403 and time slot reservation information extracting unit 408, the information storage unit 411 changes the stored contents as far as communication in this frame alone is concerned. When communication of the frame in which the time slot reservation information has been entered has been completed, the time slot assignment information storage unit 411 changes the stored contents of the time slot assignment information to the contents of the preceding frame assigned before the change. In a case where the time slot reservation information has entered, the time slot assignment information storage unit 411 changes the stored contents of the time slot assignment information as far as communication in this frame only is concerned. The transceive control unit 412 operates based upon the time slot assignment, information that is output from the time slot assignment information storage unit 411 and controls the transmission data generator 401, frame synchronizing signal generating unit 404 and selector 405 in order that the above-described, operations will be executed.

Internal Configuration of Finger Control Units 103-1 to 103-5

Reference will be had to FIG. 5 to describe the internal configuration of the finger control units 103-1 to 103-5 that function as communication apparatuses in the first embodiment. Blocks similar to those that construct the overall control unit 101 shown in FIG. 4 are designated by like reference characters and need not be described again. Only the blocks that differ from those of FIG. 4 will be described.

Based upon the angular deviations that are input from the joint control units (the first joint control unit and the second joint control unit), a transmission data generating unit 501 generates transmission data by obtaining a fingertip position deviation through computation. In this embodiment, the transmission data generating unit 501 starts generating the transmission data after target fingertip positions have been transmitted from the overall control unit 101 to all of the finger control units 103-1 to 103-5 (e.g., after time slot 5 in FIG. 3). The transceive control unit 412 notifies the transmission data generating unit 501 of the timing of the transmission time slot. At this time the transmission data generating unit 501 discriminates the progress of the processing for generating data to be transmitted and outputs the transmission data to a selector 502 if generation of the data to be transmitted has been completed in the transmission time slot. If generation of the transmission data has not been completed, then the transmission data generating unit 501 outputs the progress of the processing for generating the transmission data to the transmission data generation completion discriminating unit 402.

The selector 502 operates based upon control exercised by the transceive control unit 412. The selector 502 outputs any one of the outputs of the transmission data generator 501 and time slot reservation information generating unit 403 to a line driver 506. The line driver 506 transmits the data that enters from the selector 502 to the overall control unit and to the other finger control units. If there is no input data from the selector 502, then the line driver 506 places its output terminal at a high impedance. A line receiver 507 receives data from the overall control unit and other finger control units and outputs the data to a frame synchronizing signal extracting unit 503.

The frame synchronizing signal extracting unit 503 detects, by pattern sensing, the frame synchronizing signal transmitted from the overall control unit 101. A tame slot counter 504 increments its count value whenever a time equivalent to one time slot elapses and outputs the count value to the time slot assignment information storage unit 411. The count value is reset whenever the frame synchronizing signal is detected.

A control information generating unit 505 computes the angles of the joints that satisfy the received target fingertip position and outputs these joint angles to the joint control units (first and second joint control units). The control information generating unit 505 of this embodiment starts the computation of the joint angles after the target fingertip positions have been transmitted from the overall control unit 101 to all of the ringer control units 103-1 to 103-5 (e.g., alter time slot 5 of FIG. 3).

Transmitting Operation

The communicating operation of the overall control unit 101 and finger control units 103-1 to 103-5 will now be described. FIG. 6 is an operation flowchart relating to the transmitting operation of the overall control unit 101 and finger control units 103-1 to 103-5, and FIG. 7 is an operation flowchart relating to the receiving operation of these units.

The frame-by-frame transmitting operation will be described first. At step S601, the overall control unit 101 and finger control units 103-1 to 103-5 determine whether transmission processing of the frame has been completed. At step S601, if transmission processing of the frame has been completed ("YES" at step S601), processing proceeds to step S610. On the other hand, if the determination made at step S601 is that, transmission processing of the frame has not been completed ("NO" at step S601), then processing proceeds to step S602. At step S602, it is determined whether timing for generating transmission data has arrived. If this is not timing for generating transmission data ("NO" at step S602), then processing returns to step S601 and the processing of step S601 is repeated. On the other hand, if notification of transmission data generation timing has been given and the timing for generating transmission data has arrived ("YES" at step S602), then processing proceeds to a transmission data generating step S603 and transmission data is generated (step S603).

When notification of the timing of the transmission time slot is given, at step S604 it is determined whether the generation of transmission data for performing transmission in this transmission time slot has been completed. If the generation of the transmission data has been completed ("YES" at step S604), then processing proceeds to step S605. Here the generated data is transmitted in the assigned transmission time slot. Processing then, returns to step S601.

On the other hand, if it is determined at step S604 that the generation of the transmission data has not been completed ("NO" at step 3604), then processing proceeds to step S606, where it is determined whether there is a reservable available slot that fails on or after the time slot in which the completion of transmission data generation processing has been estimated. If there is no reservable available slot ("NO" at step S606), processing returns to step S601 and data transmission within this frame is not carried out.

If existence of a reservable available slot is determined ("YES" at step S606), processing proceeds to step S607, where time slot reservation information is generated. At step S608, based upon the time slot reservation information generated at the preceding step S607, the communication apparatus changes the stored contents of its own time slot assignment information as far as communication in this frame only is concerned.

At step S609, the time slot reservation information is transmitted. Processing then returns to step S603 and processing for generating transmission data is executed. When processing of the frame is completed, the stored contents of the time slot assignment information are changed at step S610 to the contents of the preceding frame assigned before the change. Operation is then terminated.

Receiving Operation

The receiving operation will be described next.

At step S701 in FIG. 7, the overall control unit 101 and finger control units 103-1 to 103-5 determine whether reception processing of the frame has been completed. At step S701, if reception processing of the frame has been completed ("YES" at step S701), processing proceeds to step S706. On the other hand, if the determination made at step S701 is that, reception processing of the frame has not been completed ("NO" at step S701), then processing proceeds to step S702.

At step S702, it is determined whether the time slot reservation information has been received. If the time slot reservation information has not been received ("NO" at step S702), processing proceeds to step S703. At step S703, it is determined whether this is a time slot for which this communication apparatus itself is the destination of reception. If this is a time slot for which this communication apparatus itself is the destination of reception ("YES" at step S703), processing proceeds to step S704 and the reception data is extracted (step S704). If the result of the determination made at step S703 is that this is not a time slot for which this communication apparatus itself is the destination of reception ("NO" at step S703), then processing returns to step S701 and similar processing is repeated.

If the result of the determination made at step S702 is that time slot reservation information has been received ("YES" at step S702), processing proceeds to step S705. Here, based upon the time slot reservation information that has been received, the stored contents of the time slot reservation information is changed as far as this frame only is concerned, processing returns to step S702 and similar processing is repeated.

If it is determined at step S701 that reception processing of this frame has been completed ("YES" at step S701), processing proceeds to step S706, where the stored contents of the time slot assignment information are changed to the contents of the preceding frame assigned before the change. Operation is then terminated.

Specific Example of Communication Operation

Described next is a specific example of a communication operation in a case where processing for generating transmission data in the finger control unit 103-1 has not been completed. The time slot reservation information generating unit 403 of finger control unit 103-1 requests the time slot assignment information, storage unit 411 for a reservable time slot and determines whether reservation of a time slot is possible (step S606). The time slot reservation information generating unit 403 of the finger control unit 103-1 generates time slot reservation information for reserving an available time slot (step S607).

Assume here that the time slot reservation information generating unit 403 of finger control unit 103 is notified by the transmission data generation completion discriminating unit 402 of the fact that time slot 13 in FIG. 3 is the time slot in which it is estimated that the generation of transmission data will be completed. In this case, the time slot reservation information generating unit 403 generates time slot reservation information for reserving time slot 14 which is later than time slot 13 and, moreover, which is an available time slot.

The stored contents of the time slot assignment information in this communication apparatus' own time slot assignment information storage unit 411 are changed to the contents shown in FIG. 8 (step S608). At step S608, the finger control unit 103-1 is set as the transmission source, the overall control unit 101 is set as the reception destination, and the fingertip position deviation found by the finger control unit 103-1 is set as the contents of the transmission.

At step S609, the time slot reservation information is transmitted to the overall control unit 101 and to the other finger control units 103-2 to 103-5 from which the finger control unit 103-1, which is the local communication apparatus now being described, is excluded. The overall control unit 101 and finger control units 103-2 to 103-5 receive the time slot reservation information transmitted from the finger control unit 103-1. Based upon the time slot reservation information, the overall control unit 101 and finger control units 103-2 to 103-5 change the stored contents of the time slot assignment information in time slot assignment information storage unit 411 to the contents shown in FIG. 8 (step S705). The finger control unit 103-1 resumes processing for generating transmission data after the transmission of the time slot reservation information and transmits the data, whose generation has been completed, in time slot 14, which comes after the time slot assigned originally.

When processing of the received frame is completed, the overall control unit 101 and finger control units 103-2 to 103-5 change the stored contents of the time slot assignment information to the contents of the preceding frame (the contents shown in FIG. 3) (steps S610 and S706).

Owing to receipt of the time slot reservation information, the overall control unit 101 and the finger control units 103-2 to 103-5 change the stored contents of the time slot assignment information in the time slot assignment information storage unit 411 with regard to this frame only. The stored contents of the time slot assignment information that prevailed before the change (the contents of the preceding frame) are being retained in the time slot assignment information storage unit 411. Following the completion of processing of the received frame, the overall control unit 101 and finger control units 103-2 to 103-5 change the changed stored contents of the time slot assignment information to the retained contents of the preceding frame (steps S610 and S706).

Operation in a case where the generation of transmission data by the finger control unit 103-1 has not been completed has been described as an example. However, a similar operation is carried out also with regard to a case where the generation of transmission data has not been completed in the overall control unit 101 and finger control units 103-2 to 103-5. In should be noted that in a case where the generation of transmission data has not been completed in a plurality of the control units within one frame, there will be instances where available time slots vanish. In such case a data transmission within this frame as put on hold because an available time slot can no longer be reserved. Further, a data transmission is put on hold in similar fashion also in a case where there is no available time slot that falls on or after the time slot in which the completion of processing for generating transmission data has been estimated to occur.

In this embodiment, an arrangement has been adopted in which, if the generation of data (transmission data) to be transmitted will not be completed by the time of an assigned transmission time slot, then an available time slot to be reserved is decided upon taking into consideration the length of time required for the completion of generation of the transmission data. However, it is permissible to adopt an arrangement in which, any available time slot is reserved without taking into consideration the length of time required for the completion of generation of the transmission data. If the generation of transmission data will not be completed in an initially reserved available time slot in such case, then reservation of an available time slot is performed again.

In this embodiment, the arrangement is such that one time slot is assigned whenever there is communication between the overall control unit 101 and the finger control units 103-1 to 103-5. However, it is also possible to assign a plurality of time slots. In this case, starting and end numbers of the time slots, for example, are set in the time slot reservation information in order to specify the plurality of time slots that will be reserved. Furthermore, the time slot reservation information includes data comprising the transmission source and reception destination of the time slot reservation information. It will suffice to arrange it so that the time slot assignment information storage unit 411 changes the time slot assignment information based upon this time slot reservation information.

In this embodiment, an arrangement has been described for dealing with a case where the generation of transmission data is not completed in all of the control units, namely the overall control unit 101 and finger control units 103-1 to 103-5. However, in a case where the processing time for generating transmission data fluctuates only in a predetermined control unit, it is possible to adopt a simpler arrangement. For example, in a case where the processing time for generating transmission data fluctuates only in the overall control unit 101, it is arranged so that the reserving of an available time slot is carried out only by the overall control unit 101. In such case the effects of the present invention can be obtained in similar fashion even if the time slot reservation information extracting unit 408 of the overall control unit 101 and the transmission data generation completion discriminating unit 402 and time slot reservation information generating unit 403 of the finger control units 103-1 to 103-5 are omitted.

This embodiment is such that in a case where the generation of transmission data will not be completed by the time of an assigned transmission time slot, the reserving of an available time slot is performed using the assigned transmission time slot. By performing the data transmission using the reserved time slot, it is possible to carry out communication in which the omission of communication data is avoided. With control using TDMA-based cyclic communication, omission of communication data can be avoided. This makes possible a control that excels in control precision and stability. Since omission of communication data can be similarly prevented even in a case where frame length is shortened, control cycle time can be shortened and it is possible to improve control precision and response.

Second Embodiment

In the first embodiment, an arrangement is described in which data transmission is performed using an available time slot in a case where generation of transmission data is not completed by the time of the assigned transmission time slot. If a large number of time slots have been disposed between an assigned transmission time slot and an available time slot, transmission timing in the applicable frame will deviate greatly. In a control system in which the fixed periodicity of transmission timing is of prime importance, there are instances where such transmission timing deviation, namely jitter, becomes a problem. In a case where cyclic control of a control system is carried out, often it is possible to improve control precision and control stability the smaller the control-related jitter is made. This embodiment provides an arrangement in which, if the generation of transmission data will not be completed, it is possible to avoid omission of communication data without causing a large amount of jitter in transmission timing.

In this embodiment, the overall control unit 101 and finger control units 103-2 to 103-5 reserve any time slot, not just an available time slot, in a case where the generation of transmission data is not completed by the time of the assigned transmission time slot. More specifically, among available time slots and already assigned time slots within a frame, a time slot that comes after an originally assigned time slot for transmission is reserved as a time slot used in transmission of data.

By using the time slot reservation information generated by the above-described time slot reservation information generating unit, assignment of a time slot among time slots from a reserved time slot onward is changed by the time slot reservation information so as to be shifted to a later time, in communication just in this frame, by an amount equivalent to the time slots reserved.

In the overall control unit or finger control units, and in communication in this frame only, assignment of a time slot among time slots from a reserved time slot onward is changed by the time slot reservation information so as to be shifted to a later time by an amount equivalent to the time slots reserved.

Internal Configuration of Overall Control Unit 101

Figure 9:
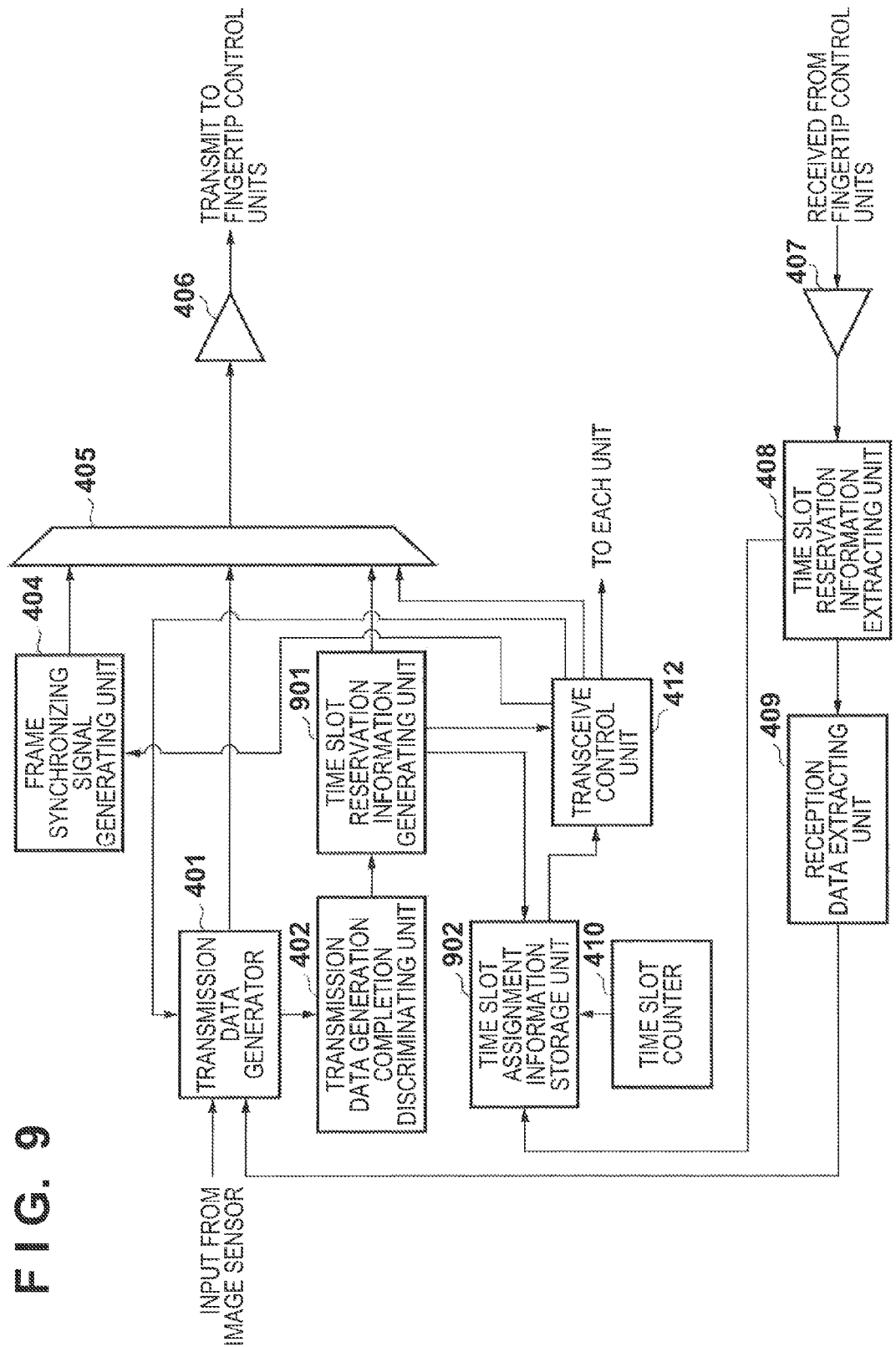
FIG. 9 is a block diagram illustrating the internal configuration of an overall control unit in a second embodiment.

Reference will be had to FIG. 9 to describe the internal configuration of the overall control unit 101 in the second embodiment. Blocks similar to those that construct the overall control unit 101 of the first embodiment shown in FIG. 4 are designated by like reference characters and need not be described again.

A time slot reservation information generating unit 901 generates time slot reservation information for reserving use of a time slot which fails on or after the number of the time slot that enters from the transmission data generation completion discriminating unit 402. Unlike the time slot reservation information generating unit 403 of the first embodiment, the time slot reservation information generating unit 901 generates information for reserving any time slot, not just an available time slot. That is, among available time slots and already assigned time slots within a frame, a time slot later than an originally assigned time slot for transmission is adopted as a time slot to be reserved. Here the time slot reservation information is data comprising the number of the time slot that will be reserved, the transmission source and the reception destination. In a case where the time slot reservation information generating unit 901 generates time slot reservation information, the unit notifies the time slot assignment information storage unit 902 of the contents of this information. The transmission data generation completion discriminating unit 901 further notifies the transceive control unit 412 of the fact that the time slot reservation information has been generated. The transceive control unit 412 controls the selector 405 based upon this notification.

The time slot assignment information shown in FIG. 3 has been stored in the time slot assignment information storage unit 902. The time slot assignment information storage unit 902 outputs time slot assignment information, which conforms to the count value that enters from the time slot counter 410, to the transceive control unit 412. The time slot assignment information storage unit 902 (also referred to simply as "information storage unit 902" below) changes the stored contents of the time slot assignment information (also referred to as "stored contents" below) in accordance with the input of time slot assignment information. In a case where time slot reservation information has entered from at least one of time slot reservation information generating unit 901 and time slot reservation information extracting unit 408, the information storage unit 902 changes the stored contents in this frame only. Here, based upon the time slot reservation information, the time slot assignment information storage unit 902 changes the stored contents of the time slot assignment information in such a manner that the schedule from the reserved time slot onward is shifted to a later time. For example, FIG. 10 illustrates the schedule in a case where time slot 5 has been reserved in time slot 3 for the transmission from overall control unit 101 to the finger control unit 103-3. In this case, the time slot reservation information is transmitted in time slot 3 and time slot 5 becomes the time slot in which a transmission is made from the overall control unit 101 to the finger control unit 103-3. The stored contents of the time slot assignment information are changed in such a manner that the schedule from time slot 5 onward is shifted one slot later in time. That is, the data that has been set in time slot 5 in FIG. 3 has its assignment changed to time slot 6 (FIG. 10), which is one time slot later.

It should be noted that, as shown in FIG. 11, it may be arranged so that the time slot assignment information is changed so as to reduce the number of available time slots without changing the time slot assignment of the transmission time slot from the finger control units 103-1 to 103-5 to the overall control unit 101. For example, although time slots 7 and 8 in FIG. 10 are available time slots, it is possible to change time slot assignment so as to eliminate available time slot 8, as shown in FIG. 11. In this case, it is possible to perform communication without jitter being produced in the timing of transmission from finger control, units 103-1 to 103-5 to overall control unit 101.

Further, it may be arranged so that, in a case where the time slot reservation information generating unit 901 has reserved an available time slot, the schedule from the reserved time slot onward is not shifted to a later time. Operation in this case is similar to that of the first embodiment. In this case as well, it is possible to perform communication without jitter being produced in the timing of transmission from finger control units 103-1 to 103-5 to overall control unit 101.

Internal Configuration of Finger Control Units 103-1 to 103-5

Reference will be had to FIG. 12 to describe the internal configuration of the finger control units 103-1 to 103-5 in the second embodiment. Blocks similar to those that construct the finger control units 103-1 to 103-5 shown in FIG. 5 are designated by like reference characters and need not be described again. A time slot reservation information generating unit 1201 and a time slot assignment information storage unit 1202 operate in a manner similar to the time slot reservation information generating unit 901 and time slot assignment information storage unit 902 of the overall control unit 101 in this embodiment. For example, FIG. 13 illustrates time slot assignment in a case where time slot 12 has been reserved in time slot 10 for the transmission from finger control unit 103-3 to overall control unit 101 in the time slot assignment of FIG. 3. In this case, the time slot reservation information is transmitted from ringer control unit 103-3 to overall control unit 101 in time slot 10 and time slot 12 becomes the time slot in which data is transmitted from the finger control unit 103-3 to the overall control unit 101. The stored contents of the time slot assignment information are changed in such a manner that the schedule from time slot 12 onward is shifted one slot later in time.

The flow of the communication operation of the overall control unit 101 and finger control units 103-1 to 103-5 of this embodiment is similar to that of the first embodiment. However, since the operations performed at steps S606 and S607 differ from those of the first embodiment, these steps will be described here but the others will not.

In a case where it is determined at step S604, prior to step S606, that generation of transmission data has not been completed ("NO" at step S604), processing proceeds to step 3606. Here it is determined whether processing for generating transmission data has been completed within this frame and, if it is determined that this processing has not been completed within this frame, processing returns to step S601. In this case, data transmission in this frame is put on hold. If it is determined at step S606 that processing for generating transmission data has been completed within this frame, then processing proceeds to step S607.

At step S607, time slot reservation information is generated for reserving any time slot on or after the time slot in which it has been estimated that generation of transmission data will be completed. That is, among available time slots and already assigned time slots within a frame, a time slot that comes after an originally assigned time slot for transmission is adopted as a time slot to be reserved.

For example, assume that in finger control unit 103-1, the generation of transmission data has not been completed by the time of time slot 8 in FIG. 3 and that it is estimated that processing for generating transmission data will be completed in time slot 10. In this case, the finger control unit 103-1 generates time slot reservation information for reserving any time slot (e.g., time slot 12) from time slot 11 onward. In this embodiment, if, in a case where a plurality of the control units have performed reservation of time slots, the time slots of control units that have been assigned to the frame after this frame will no longer fit in this frame, then the data transmission in this frame is put on hold. However, a fluctuation in the processing time for generating transmission data will occur in terms of probability, and the probability that a plurality of the control units will reserve time slots in the same frame is sufficiently small. This means that it is possible for the system to operate without any practical problems.

In this embodiment, an arrangement has been described in which a time slot to be reserved is decided upon estimating a time slot in which the generation of transmission data will be completed.

Although a modification of an arrangement in which any time slot is reserved without estimating the time slot in which the generation of transmission data will be completed is conceivable, in this case it is highly likely that generation of the transmission data will not be completed by the time of the reserved time slot. In a case where generation of transmission data is not completed by the time of the reserved time slot, the reserving of a time slot is performed again, no transmission of valid data is carried out and transmission efficiency declines.

In this embodiment, a time slot to be reserved is decided upon estimating the completion of the generation of transmission data. In comparison, therefore, with a case where any time slot is reserved, as in the above-mentioned modification, it is possible to raise transmission efficiency.

In this embodiment, if the generation of transmission data is not completed by the time of an assigned transmission time slot, any time slot is reserved using the assigned transmission time slot. A control unit to which has been assigned a time slot among time slots from the reserved time slot onward uses a time slot, in this frame only, that as later by the number of reserved time slots. As a result, even if the generation of transmission data is not completed, it is possible to avoid omission of communication data without producing a large amount of jitter in transmission timing. Consequently, in a control system in which the fixed periodicity of transmission timing is of prime importance, control precision and control stability can be improved. It should be noted that time slot reservation information comprises the number of a time slot to be reserved, the transmission source and the reception destination. Accordingly, the amount of data necessary in order to change the time slot assignments of a plurality of control units is small and assignment of time slots within a frame can be changed efficiently and dynamically in conformity with the configuration of the control system.

Further, it is possible to generate time slot reservation information so as to change over the selection of a reserved time slot based upon the control unit functioning as a communication apparatus or the type of transmission data. For example, in a case where generation of transmission data will not be completed, it is possible to operate the time slot reservation information generating unit 901 as follows: In case of a control unit or transmission data in which the fixed periodicity of transmission timing is of prime importance, any time slot that includes a time slot that has been assigned to another control unit is adopted as the time slot to be reserved. In case of a control unit or transmission data in which the fixed periodicity of transmission timing is not of prime importance, it is arranged so that an available time slot is reserved only when an available time slot exists. Furthermore, with regard to a control unit or transmission data in which omission of communication within the frame is allowed, it is also possible to arrange it so that time slot reservation is not carried out. As a result, in a case where a different control precision and control stability are required for each finger control unit, for example, it is possible to carry out communication that conforms to the required control precision and control stability.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-090406, filed Apr. 14, 2011, which is hereby incorporated by reference herein in its entirety.

What is claimed is:

1. A communication apparatus comprising:
a transmitting unit configured to transmit data in a first transmission time slot, which has been assigned within a frame in order to transmit data from the communication apparatus; and
a reserving unit configured to reserve, in a case where data cannot be transmitted in the first transmission time slot, a second transmission time slot whose position is later than a position of the first transmission time slot within the frame having the first transmission time slot,
wherein the reserving unit reserves the second transmission time slot by transmitting reservation information for reserving the second transmission time slot to another communication apparatus in the first transmission time slot.

2. The apparatus according to claim 1, further comprising a determination unit configured to determine whether generation of data to be transmitted is completed by the time of the first transmission time slot,
wherein in a case where it is determined by the determination unit that generation of data to be transmitted is not completed by the time of the first transmission time slot, the reserving unit reserves the second transmission time slot.

3. The apparatus according to claim 1, wherein the reserving unit changes time slot assignment of the frame having the first transmission time slot in which the data cannot be transmitted, by reserving the second transmission time slot.

4. The apparatus according to claim 1, further comprising a receiving unit configured to receive reservation information transmitted from another communication apparatus,
wherein based upon the reservation information received by the receiving unit, the reserving unit changes time slot assignment of the frame in which the reservation information has been received.

5. The apparatus according to claim 1, wherein the reserving unit reserves an unassigned available time slot as the time slot used to transmit the data.

6. The apparatus according to claim 1, wherein the reserving unit reserves an already assigned time slot as the time slot used to transmit the data.

7. The apparatus according to claim 1, wherein the reserving unit changes assignment of a time slot among time slots from a reserved time slot onward so as to shift the time slot to a time later than the reserved time slot.

8. A non-transitory computer-readable storage medium storing a program for causing a computer to function as each unit of the communication apparatus set forth in claim 1.

9. A communication system having a plurality of communication apparatuses, wherein a first communication apparatus comprises:
a transmitting unit configured to transmit data in a first transmission time slot, which has been assigned within a frame in order to transmit data from the first communication apparatus; and
a reserving unit configured to reserve, in a case where data cannot be transmitted in the first transmission time slot, a second transmission time slot for transmitting the data, which cannot be transmitted, within the frame having the first transmission time slot, wherein the reserving unit reserves the second transmission time slot whose position is later than a position of the first transmission time slot; and
a second communication apparatus comprises:
a detecting unit configured to detect the second transmission time slot reserved by the reserving unit of the first communication apparatus; and
a changing unit configured to change time slot assignment of the frame in which the second transmission time slot has been reserved, based upon the reservation detected by the detecting unit.

10. A method of controlling a communication apparatus, comprising:

transmitting data in a first transmission time slot, which has been assigned within a frame in order to transmit data from the communication apparatus; and reserving, in a case where data cannot be transmitted in the first transmission time slot, a second transmission time slot whose position is later than a position of the first transmission time slot within the frame having the first transmission time slot, wherein the second transmission time slot is reserved by transmitting reservation information for reserving the second transmission time slot to another communication apparatus in the first transmission time slot.

11. A communication apparatus, comprising:

a transmitting unit configured to transmit data in a first transmission time slot, which has been assigned within a frame in order to transmit data from the communication apparatus;

a reserving unit configured to reserve, in a case where data cannot be transmitted in the first transmission time slot, a second transmission time slot whose position is later than position of the first transmission time slot within the frame having the first transmission time slot; and a receiving unit configured to receive reservation information transmitted from another communication apparatus, wherein based upon the reservation information received by the receiving unit, the reserving unit changes time slot assignment of the frame in which the reservation information has been received.

12. The apparatus according to claim 11, further comprising a determination unit configured to determine whether generation of data to be transmitted is completed by the time of the first transmission time slot, wherein in a case where it is determined by the determination unit that generation of data to be transmitted is not completed by the time of the first transmission time slot, the reserving unit reserves the second transmission time slot.

13. The apparatus according to claim 11, wherein the reserving unit changes time slot assignment of the frame having the first transmission time slot in which the data cannot be transmitted, by reserving the second transmission time slot.

14. The apparatus according to claim 11, wherein the reserving unit reserves an unassigned available time slot as the time slot used to transmit the data.

15. The apparatus according to claim 11, wherein the reserving unit reserves an already assigned time slot as the time slot used to transmit the data.

16. The apparatus according to claim 11, wherein the reserving unit changes assignment of a time slot among time slots from a reserved time slot onward so as to shift the time slot to a time later than the reserved time slot.

17. A non-transitory computer-readable storage medium storing a program for causing a computer to function as each unit of the communication apparatus set forth in claim 11.

18. A method of controlling a communication apparatus, comprising:

transmitting data in a first transmission time slot, which has been assigned within a frame in order to transmit data from the communication apparatus;

reserving, in a case where data cannot be transmitted in the first transmission time slot, a second transmission time slot whose position is later than a position of the first transmission time slot within the frame having the first transmission time slot; and receiving reservation information transmitted from another communication apparatus, wherein, based upon the received reservation information, the time slot assignment of the frame in which the reservation information has been received is changed.

* * * * *